United States Patent
Kelly et al.

(10) Patent No.: US 11,316,873 B2
(45) Date of Patent: Apr. 26, 2022

(54) DETECTING MALICIOUS THREATS VIA AUTOSTART EXECUTION POINT ANALYSIS

(71) Applicant: Bank of America Corporation, Charlotte, NC (US)

(72) Inventors: Matthew E. Kelly, Chicago, IL (US); Jeffrey Dye, Charlotte, NC (US); Dan E. Summers, Buckley (GB); David Arnett, Northridge, CA (US); Michael E. H. Dunten, Indianapolis, IN (US)

(73) Assignee: Bank of America Corporation, Charlotte, NC (US)

( * ) Notice: Subject to any disclaimer, the term of this patent is extended or adjusted under 35 U.S.C. 154(b) by 551 days.

(21) Appl. No.: 16/456,637

(22) Filed: Jun. 28, 2019

(65) Prior Publication Data

US 2020/0412745 A1 Dec. 31, 2020

(51) Int. Cl.
*H04L 9/40* (2022.01)
*H04L 29/06* (2006.01)
*G06F 11/30* (2006.01)
*G06F 11/34* (2006.01)

(52) U.S. Cl.
CPC ...... *H04L 63/1416* (2013.01); *G06F 11/3006* (2013.01); *G06F 11/3065* (2013.01); *G06F 11/3495* (2013.01); *H04L 63/1425* (2013.01)

(58) Field of Classification Search
CPC ............. H04L 63/1416; H04L 63/1425; G06F 11/3006; G06F 11/3065; G06F 11/3495
See application file for complete search history.

(56) References Cited

U.S. PATENT DOCUMENTS

| | | |
|---|---|---|
| 1,000,937 A | 8/1911 | Peeler |
| 6,321,338 B1 | 11/2001 | Porras et al. |
| 7,007,302 B1 | 2/2006 | Jagger et al. |
| 7,647,636 B2 | 1/2010 | Polyakov et al. |
| 7,730,040 B2 | 6/2010 | Reasor et al. |
| 7,971,258 B1 | 6/2011 | Liao et al. |
| 8,266,692 B2 | 9/2012 | Wenzinger et al. |
| 8,365,297 B1 | 1/2013 | Parshin et al. |
| 8,468,602 B2 | 6/2013 | McDougal et al. |
| 8,468,604 B2 | 6/2013 | Claudatos et al. |
| 8,479,296 B2 | 7/2013 | Mashevsky et al. |
| 8,661,541 B2 | 2/2014 | Beck et al. |

(Continued)

*Primary Examiner* — Arvin Eskandarnia

(57) ABSTRACT

The system collects startup commands associated with network-attached computing devices. A startup command is automatically executed by a device on which the startup command is stored upon startup of the device and is associated with a device identifier for the device. For each startup command, a corresponding command tag is determined for the startup command using a verb list. Using the device identifier associated with each startup command and the command tag determined for each startup command, a proportion of the plurality of devices is determined that are associated with each command tag. Based on the determined proportion of the plurality of devices that are associated with each command tag, a suspicious command tag is determined. A report is stored that includes the suspicious command tag, suspicious startup command(s) associated with the suspicious command tag, and the device identifier associated with each suspicious startup command.

20 Claims, 4 Drawing Sheets

(56) References Cited

U.S. PATENT DOCUMENTS

| | | | |
|---|---|---|---|
| 8,707,427 B2 | 4/2014 | Hooks et al. | |
| 8,898,788 B1 | 11/2014 | Aziz et al. | |
| 8,955,124 B2 | 2/2015 | Kim et al. | |
| 9,178,900 B1 | 11/2015 | Li et al. | |
| 9,183,386 B2 | 11/2015 | Faieta et al. | |
| 9,213,831 B2 | 12/2015 | Sridhara et al. | |
| 9,330,260 B1 | 5/2016 | Guo | |
| 9,392,015 B2 | 7/2016 | Thomas | |
| 9,654,489 B2 | 5/2017 | Thomas | |
| 9,665,713 B2 | 5/2017 | Avasarala et al. | |
| 9,690,933 B1 | 6/2017 | Singh et al. | |
| 9,690,938 B1 | 6/2017 | Saxe et al. | |
| 9,769,198 B1 | 9/2017 | Adams et al. | |
| 9,804,869 B1 | 10/2017 | Wang et al. | |
| 10,122,753 B2 | 11/2018 | Thomas | |
| 10,216,933 B1 | 2/2019 | Curtin | |
| 10,581,888 B1* | 3/2020 | Agranonik | H04L 63/1425 |
| 2003/0074574 A1 | 4/2003 | Hursey et al. | |
| 2005/0187740 A1 | 8/2005 | Marinescu | |
| 2005/0268112 A1 | 12/2005 | Wang et al. | |
| 2007/0016952 A1 | 1/2007 | Stevens | |
| 2007/0038677 A1 | 2/2007 | Reasor et al. | |
| 2009/0089040 A1 | 4/2009 | Monastyrsky et al. | |
| 2011/0162077 A1* | 6/2011 | Kadam | G06F 12/1425 |
| | | | 711/163 |
| 2012/0266243 A1 | 10/2012 | Turkulainen | |
| 2017/0372071 A1 | 12/2017 | Saxe | |
| 2018/0089428 A1 | 3/2018 | Green et al. | |
| 2018/0124070 A1 | 5/2018 | Kailash et al. | |
| 2018/0276380 A1 | 9/2018 | Ladnai et al. | |
| 2018/0288077 A1 | 10/2018 | Siddiqui et al. | |
| 2019/0020663 A1 | 1/2019 | Bartos et al. | |
| 2019/0042746 A1 | 2/2019 | Nayshtut et al. | |
| 2019/0141071 A1 | 5/2019 | Heilig | |
| 2019/0163903 A1 | 5/2019 | Thakar et al. | |
| 2019/0205090 A1* | 7/2019 | Ohnishi | G10L 15/08 |

* cited by examiner

DETECTING MALICIOUS THREATS VIA AUTOSTART EXECUTION POINT ANALYSIS

TECHNICAL FIELD

The present disclosure relates generally to malware detection. More particularly, in certain embodiments, the present disclosure is related to systems and methods for detecting malicious threats via Autostart Execution Point analysis.

BACKGROUND

The operating systems of computing devices generally include multiple startup commands, which may, for example, be associated with Autostart Execution Point (ASEP) entries, or other commands that are initiated automatically upon startup of a computing device. Startup commands generally cause applications and/or services to be automatically executed upon startup of the operating system of the computing device. Startup commands stored in the device (e.g., in a registry associated with the operating system or any other appropriate file location) determine which applications and/or services are automatically executed and how they are executed, when the operating system is started (e.g., booted up or rebooted). In many cases, the applications that are automatically started by these startup commands have a helpful or benign effect on system performance and usability. However, certain startup commands can be put in place by malware or malicious attacks on a device, and these startup commands can cause malware to be automatically executed or reloaded upon startup of the device. These malicious startup commands can result in malware that is persistent and that is reinstalled on the device upon each startup, even after the associated malware had seemingly been removed using a malware detection and removal tool such as antivirus software.

SUMMARY

Certain malware can be detected and removed using existing malware detection and removal tools when the malware is being executed by the infected device or when files known to be associated with the malware are detected on the device. However, in some cases, one or more startup commands related to the malware can persist in the memory of the device (e.g., in a registry entry or any other file location), and malware that was believed to have been removed may be re-installed and re-executed upon startup of the device. Such malicious startup commands result in persistent malware that may be automatically reinstalled even after attempts to remove the malware from the device. Conventional malware detection and removal tools might detect a limited number of malicious startup commands that are already known to be associated with malware (e.g., when a startup command includes a string of characters that matches a string of characters known to be associated with malware). However, malicious startup commands are increasingly designed to avoid such detection by mimicking legitimate startup commands that are associated with trusted startup processes. These malicious startup commands cannot be identified using conventional tools.

In one embodiment, the system described in the present disclosure collects startup commands associated with network-attached computing devices. Each startup command is generally a command that is automatically executed by a device on which the startup command is stored upon startup of the device, and each startup command is associated with a device identifier for the device on which the command is stored. The system determines, for each startup command, a corresponding command tag for the startup command using a verb list. The system determines, using the device identifier associated with each startup command and the command tag determined for each startup command, a proportion of the plurality of devices that are associated with each command tag. The system determines, based on the determined proportion of the plurality of devices that are associated with each command tag, a suspicious command tag. The suspicious command tag is generally associated with a relatively small proportion of the devices (e.g., the suspicious command tag may be associated with less than a threshold proportion of the plurality of devices). The system stores a report that includes the suspicious command tag, one or more suspicious startup commands associated with the suspicious command tag, and the device identifier associated with each suspicious startup command.

The systems and methods described in the present disclosure provide technical solutions to the technical problems and challenges described above by first transforming startup commands associated with a plurality of network-attached computing devices into command tags, which have a standard format that is more amenable to further analysis. A model employing statistical analyses may be used to identify suspicious command tags based on the frequency that each of the command tags is observed in the plurality of devices. Generally command tags that are observed in a smaller proportion for the devices may be more likely to be associated with malware and are good candidates for further review.

The systems and methods described in the present disclosure also improve the underlying operation of computer systems used to detect malware. For example, the systems described in the present disclosure may detect persistent malware more efficiently and effectively while expending fewer processing resources than in previous systems. By transforming the startup commands into command tags, the systems and methods can more effectively and efficiently identify suspicious startup commands. This is because, for example, relationships between related or similar startup commands may not be identifiable from the commands themselves, which may include intentionally misleading strings of text or commands that may appear safe based on inspection of the startup command alone. However, the command tags, which are based on the startup commands and generally reflect the underlying function of different key portions of the commands, are more amenable to the analysis (e.g., statistical frequency analysis) described herein for identifying suspicious command tags and the corresponding suspicious startup commands.

The systems and methods described in the present disclosure may be integrated into practical applications monitoring and detecting malware in devices operated within the network of an entity such as a company, institution, or government agency. For example the systems described in the present disclosure may facilitate detection of malware in company devices to prevent attacks which may compromise sensitive customer or client information.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

As described above, the system and methods described in the present disclosure provide technical solutions to the technical problems discussed above by first transforming startup commands associated with a plurality of network-attached computing devices into more readily analyzable command tags and then using a statistical analyses to identify suspicious command tags that have an increased probability of being associated with malicious startup commands that are associated with malware. The systems and methods described in the present disclosure are more efficient and effective than conventional methods of malware detection and can be used to identify startup commands that are associated with malware that was unknown to a user.

The present disclosure encompasses the recognition of a need to identify not only startup commands that are known to be malicious but also startup commands that display suspicious properties, which suggest that the commands are more likely to be associated with malware. As described above, conventional tools generally cannot account for the wide variety of techniques used to camouflage or mask malicious startup commands in order to make them appear to be legitimate startup commands. The present disclosure also encompasses the recognition that malicious startup commands, even when camouflaged to mimic legitimate startup commands, include artifacts that can be used to determine whether the commands are suspicious (e.g., suspected of being associated with malware). As described in this disclosure, these artifacts can be identified using statistical analysis.

Figure 1:
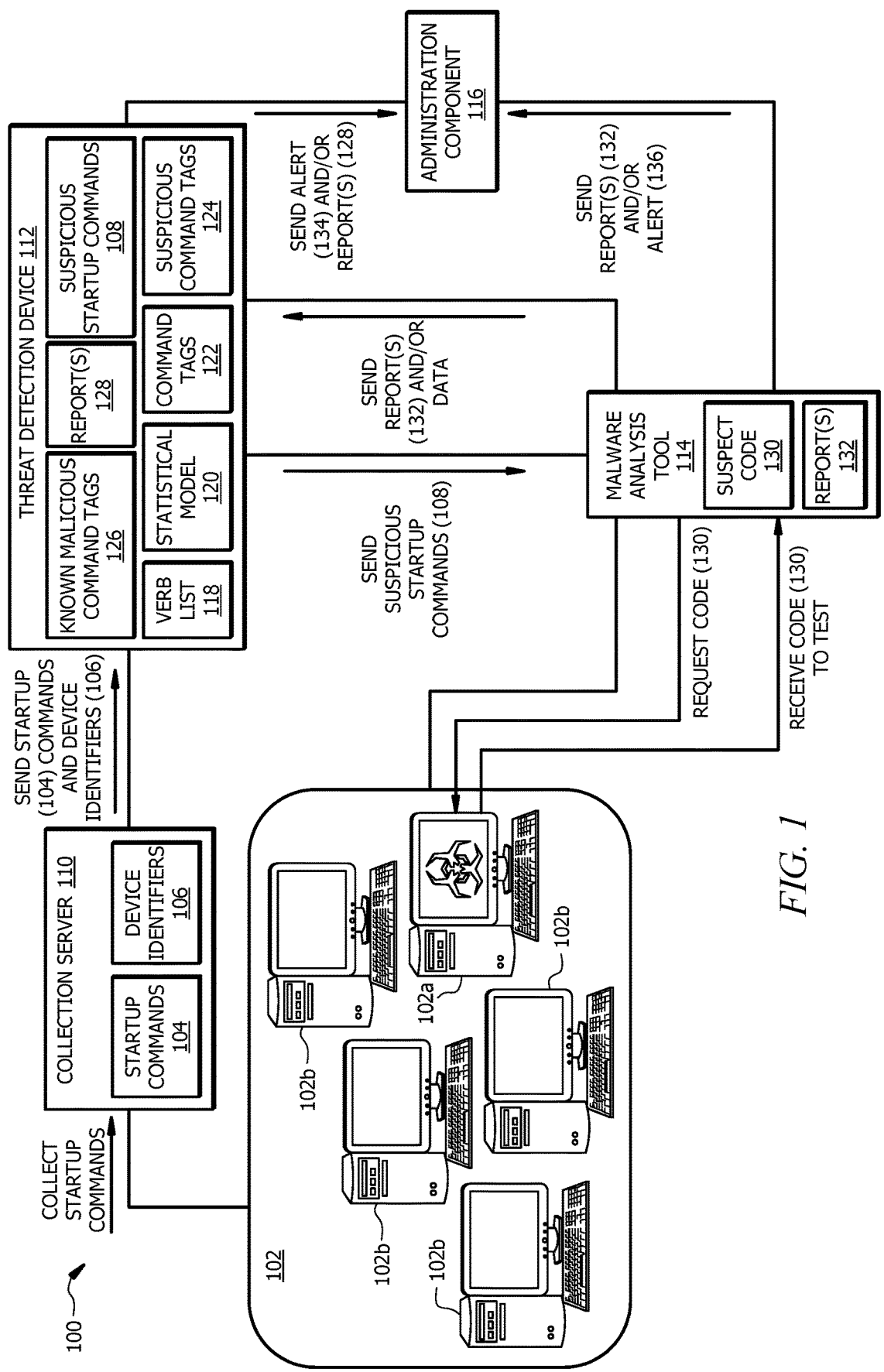
FIG. 1 is a schematic diagram of an example system for detecting suspicious startup commands.

FIG. 1 shows an example system 100 for detecting suspicious startup commands in a plurality of computing devices 102. The system 100 is generally configured to collect startup commands 104 and associated device identifiers 106 from a plurality of network-attached computing devices 102 and determine a subset of these startup commands 104 that correspond to suspicious startup commands 108 (i.e., with an increased probability of being malicious or associated with malware). In contrast to conventional malware detection systems, the system 100 is configured to perform functions that facilitate improved detection of previously undefined malicious startup commands, for example, before any symptoms of the associated malware are necessarily detected. These malicious startup commands may otherwise go undetected using conventional tools.

The example system 100 comprises devices 102, a collection server 110, a threat detection device 112, a malware analysis tool 114, and a downstream administration component 116. The system 100 may be configured as shown or in any other suitable configuration.

Devices 102 are generally any computing devices capable of storing and executing startup commands 104. For example, devices 102 may be operated on a network that is administrated via the administration component 116. The devices 102 are configured to allow collection of startup commands 104 for each device 102 (e.g., via extraction by the collection server 110 or by sending to collection server 110). The devices 102 may also be configured to allow the malware analysis tool 114 to access files and other information stored on the devices 102. In the illustrative example of FIG. 1, device 102a stores a suspicious startup command 108 that is associated with malware.

The collection server 110 is generally a device that is configured to collect startup commands 104 associated with the plurality of network-attached computing devices 102 and device identifiers 106 that link each of the collected startup commands 104 to the corresponding device 102 from which they were collected. Each startup command 104 is a command that is automatically executed upon startup of the corresponding device 102 on which the command is stored. As described in greater detail below, each of the startup commands 104 generally includes one or more command strings, which may be used by the system 100 to generate a corresponding command tag 122 for each startup command 104. The collection server 110 may, for example, be configured to increase the efficiency and accuracy of collecting, extracting, or otherwise receiving startup commands 104 from devices 102 (e.g., for efficient interfacing with devices 102 and for storage and organization of the collected startup commands 104). The collection server 110 may be implemented using the hardware, memory and interfaces of device 400 described with respect to FIG. 4 below.

The threat detection device 112 is generally a device that is configured to receive the startup commands 104 from the collection server 110 and to use these startup commands 104 to determine suspicious startup commands 108. The threat detection device 112 includes a memory to store a malicious verb list 118, a statistical threat analysis model 120, received startup commands 104, command tags 122 generated from the received startup commands 104, suspicious command tags 124 identified amongst the command tags 122 using the statistical model 120, and suspicious startup commands 108 associated with the suspicious command tags 124. The threat detection device 112 may also store one or more reports 128 generated by the threat detection device 112 and a database of known malicious command tags 126. In contrast to the collection server 110, the threat detection device 112 may be configured to facilitate efficient transformation of the startup commands 104 into command tags 122 and to facilitate statistical analyses associated with the statistical model 120 used to identify suspicious startup commands 108. The threat detection device 112 may be implemented using the hardware, memory and interfaces of device 400 described with respect to FIG. 4 below.

For each of the startup commands 104, the threat detection device 112 determines a command tag 122 using the malicious verb list 118. The verb list 118 includes a predefined tag for each of a set of known command strings. A command string generally represents a portion of a known command. For example, a command string may be associated with an identifier of an executable application (e.g., powershell.exe or rundll.exe) or a storage location of a files used by application (e.g., "temp" for a temporary file storage location). As described in greater detail below, each command tag 122 generally includes one or more tags that correspond to predefined command strings that appear in the corresponding startup command 104.

The threat detection device 112 uses the statistical model 120 to determine, using the command tags 122, a subset of the startup commands 104 corresponding to suspicious startup commands 108. In some embodiments, the suspicious command tags 124 are determined based at least in part on the proportion of the devices 102 in which the same command tag 124 is identified. For example, if the same command tag 124 is determined in a small proportion (e.g., in a less than a threshold percentage of monitored devices 102), then the command tag 124 may be a suspicious command tag 124, and any startup commands 104 associated with the suspicious command tag 124 are suspicious startup commands 108. Each suspicious command tag 124 may be associated with more than one suspicious startup command 108 because different startup commands 104 can be associated with the same command tag 122. In some embodiments, suspicious command tags 124 are identified using the record of known malicious command tags 126 (e.g., by matching a text string of a command tag to a string of text in an entry found in the record of known malicious command tags 126). One or more reports 128 may be generated by the threat detection device 112. The report(s) 128 may include any information generated by and/or stored in the threat detection device 112. For example, the report(s) 128 may include a list of suspicious command tags 126 identified by the threat detection device 112 along with the associated suspicious startup commands 108. The report(s) 128 generally facilitate further analysis of suspicious startup commands 108.

The malware analysis tool 114 is generally a device that is configured to receive suspicious command tags 124 and/or suspicious startup commands 108 from the threat detection device 112 and determine whether suspect code 130 corresponding to the suspicious startup commands 108 is associated with malware. Suspect code 130 generally includes the suspicious startup command 108 along with any underlying code, data, and/or arguments used by the corresponding device 102 to execute the potentially malware-related processes associated with the suspicious startup command 108. As shown in the illustrative example of FIG. 1, suspect code 130 is identified on device 102a, and the malware analysis tool 114 uses information provided by the threat detection device 112 to retrieve suspect code 130 from the suspect computing device 102a and determine whether this code 130 is safe (i.e., not associated with malware) or malicious (e.g., is associated with malware). The malware analysis tool 114 may be implemented using the hardware, memory and interfaces of device 400 described with respect to FIG. 4 below.

The malware analysis tool 114 may further generate one or more reports 132, which may be transmitted to one or both of the downstream administration component 116 (e.g., to inform an administrator of infected device 102a) and the threat analysis server 112 (e.g., to update information in the malicious verb list 118 and/or the threat analysis model 120). For example, the report 132 may be received by the downstream administration component 116 such that an administrator of the network associated with devices 102 may review the results to determine whether further action should be taken (e.g., to quarantine or disable the malware-infected device 102a). For example, the report 132 from the malware analysis tool 114 may be received by the threat detection device 112 and used to identify additional terms or phrases to include in the malicious verb list 118. The report 132 may also or alternatively be used by the threat detection device 112 to update statistical information of the model 120 (e.g., to update a frequency at which a given startup command 104 or command tag 122 is observed in devices 102).

The downstream administration component 116 is generally any computing device operated by an administrative entity associated with devices 102. The downstream component 116 is configured to receive one or more alerts (e.g., alerts 134 and/or 136) and/or reports (e.g., reports 128 and/or 132) from each of the threat detection device 112 and the malware analysis tool 114. In some embodiments, the downstream administration component 116 may configure operating parameters of the threat detection device 112, malware analysis tool 114, and/or collection server 110. For example, an administrator may use the administration component to update or otherwise modify the verb list 118, the list of known malicious tags 126, the statistical model 120, and any other operating parameters of the threat detection device 112 to adjust how suspicious command tags 108 are identified and how results of this identification are reported.

In an example operation of the system 100 shown in FIG. 1, startup commands 104 are collected from devices 102 by the collection server 110. The startup commands 104 include startup commands from malware-containing device 102a and malware-free devices 102b such that at least one startup command 104 from device 102a includes some evidence of the presence of malware on the device 102a. The collection server 110, for example, may be configured to access devices 102 on a regular schedule (e.g., once daily) to collect startup commands 104 for review by the threat detection device 112. The collection server 110 may also perform further functions to organize and/or format the collected startup commands 104 in any appropriate manner for subsequent analysis by the threat detection device 112.

Figure 2:
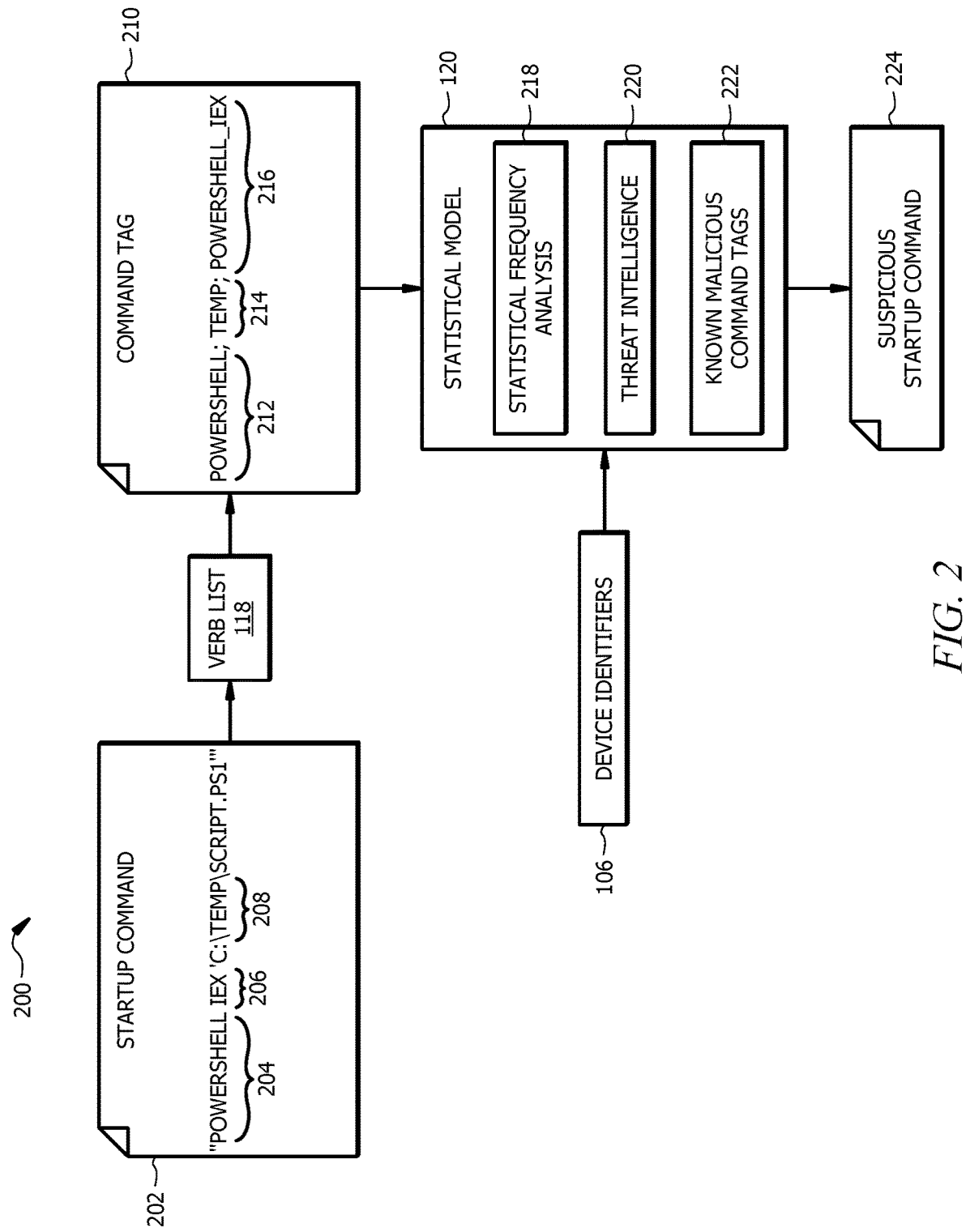
FIG. 2 is a schematic diagram illustrating the determination of suspicious startup commands using the system of FIG. 1.

Threat detection device 112 receives the startup commands 104 and uses the verb list 118 and the statistical model 120 to identify suspicious startup commands 108. FIG. 2 shows an example of the determination of a suspicious startup command 224 by the threat detection device 112 based on a startup command 202 received from device 102a. In general, the threat detection device 112 uses malicious verb list 118 and threat analysis model 120 to identify the suspicious startup command 224.

As shown in FIG. 2, the example startup command 202 includes at least a first string 204, a second string 206, and third string 208. The first string 204 may, for example, correspond to an executable application (e.g., "powershell.exe.") that is used to execute the command 202. The second string 206 corresponds to an action to perform in the executable application associated with the first string 204. The third string 208 corresponds to a file location of a file (e.g., a script-containing file) on which to perform the action associated with string 206 in the application associated with string 204.

The threat detection device 112 uses the verb list 118 to transform the startup command 202 into a command tag 210, which has a standard format that is amenable to analysis using the threat analysis model 120. A portion of an example verb list 118 is shown in TABLE 1. As demonstrated in the example of TABLE 1, the verb list 118 stores a predefined tag (third column) for each command string (first column) and for certain combinations of command strings (first and second columns). For example, certain command strings, such as "*IEX*" may be associated with a related command string such as "powershell" (fifth row of TABLE 1), such that the string pair of "*IEX*" and "powershell" have a unique tag of "powershell_iex". Certain command strings, such as "*Temp*," may not have related command strings or applications such that the associated tag is only based on the command string alone.

TABLE 1

Portion of example verb list

| Command string | Related string | Tag |
| --- | --- | --- |
| *Temp* | none | temp |
| *\Temp\* | none | temp_path |
| *-Version* | powershell | powershell_version |
| *IEX* | powershell | powershell_iex |
| *invoke-expression* | powershell | powershell_iex_2 |
| *NoP* | powershell | powershell_noprofile |
| *hidden* | powershell | powershell_hidden_window |
| *net.webclient* | powershell | powershell_webclient_downloadstring |
| *downloadfile* | powershell | powershell_downloadfile |
| *downloadstring* | powershell | powershell_downloadstring |
| *-Enc* | powershell | powershell_encoded |
| *new-process* | powershell | powershell_newprocess |
| *frombase64string* | powershell | powershell_base64encoding |
| *-ExecutionPolicy* | powershell | powershell_ep |
| *BitsTransfer* | powershell | powershell_bitstransfer |
| *ShOpenVerbShortcut | rundll | rundll_ShOpenVerbShortcut |
| *FileProtocolHandler* | rundll | rundll_FileProtocolHandler |
| *javascript | rundll | rundll_javascript |
| powershell | None | powershell |
| rundll | none | rundll |

Referring again to FIG. 2, the threat analysis device 112 uses the verb list 118 to generate the command tag 210 with a first tag 212 of "powershell," a second tag 214 of "temp," and a third tag 216 of "powershell_iex" from the command 202 of "powershell.exe IEX 'C:\temp\script.ps1'." The command tag 210 is generally a simplified version of startup command 202. Portions of the command 202 which are not likely to be associated with malware do not generally have an associated tag (e.g., in the "Tag" column of TABLE 1).

After being generated, the command tag 210 is processed using the device identifiers 106 and the statistical model 120, which includes one or more of statistical frequency analysis 218, threat intelligence analysis 220, and/or a database 222 of command tags known to be malicious in order to determine whether the command tag 210 is suspicious and has an increased probability of being associated with malware. The device identifiers 106 are used to determine in what proportion of the devices 102 each command tag 122 is observed. Statistical frequency analysis 218 involves evaluating the frequency at which different command tags 122 occur for the plurality of devices 102 shown in FIG. 1. In general, command tags 122 that occur more frequently (i.e., in greater than a threshold proportion of devices 102) have a lower probability of being associated with malware, while command tags 122 that occur less frequently (i.e., in less than or equal to a threshold proportion of devices 102) have an increased probability of being associated with malware, as described in greater detail below.

Statistical frequency analysis 218 may be used for example to determine if the command tag 210 is very common (e.g., occurring in between about 70% to about 100% of devices 102), moderately common (e.g., occurring in between about 40% to about 70% of devices 102), uncommon (e.g., occurring in between about 10% to about 40% of devices 102), very uncommon (e.g., occurring in between about 1% to about 10% of devices 102), or rare (e.g., occurring in less than about 1% of devices 102). The threat detection device 112 may use these threat levels or rankings of the frequency of command tag 210 in devices 102 and an associated threat ranking to determine whether the associated startup command 202 is trusted or suspicious. For example, a suspicious startup command 224 may have a command tag 210 with a frequency that is in the uncommon range, while a trusted startup command may have a command tag with a frequency in at least the moderately common range.

Statistical frequency analysis 218 may be used to determine a proportion (e.g., percentage) of devices 102 in which the command tag 210 is observed, and if the command tag 210 occurs in less than a threshold percentage of devices 102, the command tag 210 is considered a suspicious command tag corresponding to a suspicious startup command 224. Different threshold proportions may be used as appropriate for a given application. For example, if it is desired for the system 100 to be more selective in the identification of suspicious startup commands 108, the threshold proportion may be set to a lower value (e.g., of less 1%). For instance, in an example case, the threshold proportion value is set to a relatively selective value of 0.5%, and the suspicious startup command 224 is associated with a command tag 210 that is identified in 1.5% of devices 102. Since 1.5% is greater than the selective threshold proportion of 0.5%, the threat detection device 112 does not identify the command tag 210 as a suspicious command tag 124. Alternatively, if it is desired for the system 100 to be more inclusive in the identification of suspicious startup commands 108, a higher threshold proportion may be used. For instance, in an example case, the threshold proportion value may be set to a relatively inclusive value of 2% for the same suspicious startup command 224, which is associated with a command tag 210 that is identified in 1.5% of devices 102. Since 1.5% is less than the more inclusive threshold proportion of 2%, the threat detection device 112 identifies the command tag 210 as a suspicious command tag 124 when the more inclusive threshold value is used.

Threat intelligence analysis 220 generally involves a comparison of the command tag 210 and/or the corresponding startup command 202 to known malware-related command tags and startup commands, respectively. For example, threat intelligence analysis 220 may include determining whether the command tag 210 matches a tag that is known to be malicious using database 222 of known malicious command tags. For example, the model 120 may compare strings of text in the command tag 210 to strings of text stored in the database 222 of known malicious command tags. Based on a determination of an approximate or exact match, the model determines that the command tag 210 is associated with a suspicious startup command 224. Different matching criteria may be used as appropriate for a given application. For example, an approximate match may correspond to 80% or greater of the strings of text in the command tag 210 matching text of known malicious command tags stored in the database 222. In some embodiment, an exact (i.e., 100%) match or near exact (e.g., greater than 99%) match between the strings of text in the command tag 210 and the text of known malicious command tags stored in the database 222 is used to determine that the command tag 210 is associated with the suspicious startup command 224. If the command tag 210 is sufficiently uncommon (e.g., with a statistical frequency with an uncommon or unique ranking and/or that is observed in less than threshold proportion or number of devices 102), the tag 210 may be flagged for further review by system 100 (e.g., using malware analysis tool 114) or by an administrator associated with downstream component 116. The threat detection device 112 may also determine the corresponding suspicious startup command 224 for the tag 210. Suspicious startup commands 108 of FIG. 1 include suspicious startup command 224 of FIG. 2 along with any other suspicious startup commands 108 identified by the threat detection device 112.

Returning to FIG. 1, once the threat detection device 112 determines command tags 122 and suspicious startup commands 124, the threat detection device 112 may send an alert 134 and/or a report to the downstream administration component 116. For example, the alert 134 may be sent if at least one of the command tags 122 is determined to have a high probability of being associated with malware on at least one of the devices 102. The threat detection device 112 determines that a command tag has a high probability of being associated with malware if the command tag 122 approximately or exactly matches (e.g., according to matching criteria that are the same as or similar to those described above) a predefined command tag known to be malicious from the known malicious command tags 126. In order to prevent or reduce the number of unnecessary alerts 134, an alert 134 may not be transmitted for other suspicious startup commands 126 that are not associated with predefined command tags 126 that are known to be malicious. Instead, as shown in FIG. 1, these suspicious startup commands may be transmitted to the malware analysis tool 114 for further evaluation before an alert 134 is sent.

The malware analysis tool 114 receives the suspicious startup commands 108 and uses these startup commands 108 to determine suspect code 130 stored on the devices 102. For example, the malware analysis tool may use information in an internal database and/or access devices 102 to determine suspect code 130 associated with each of the suspicious startup commands 108. In some embodiments, each suspicious startup command 108 corresponds to one or more instances of suspect code 130 on one of devices 102. In other embodiments, an instance of suspect code 130 may be determined from a combination of suspicious startup commands (i.e., two or more startup commands may be associated with the same single instance of suspect code 130).

The malware analysis tool 114 sends a request for the suspect code 130 from devices 102 and, responsive to this request, the malware analysis tool 114 receives the suspect code 130. The malware analysis tool 114 then evaluates whether the suspect code 130 corresponds to the presence of malware. For example, the malware analysis tool 114 may test an instance of suspect code 130 by executing the code 130 in a controlled environment (e.g., a secure processing space of the malware analysis tool 114). If the suspect code 130 displays known behaviors of malware (e.g., attempting to access security sensitive applications or services) the suspicious startup command 108 associated with the suspect code 130 is determined to be a malicious startup command.

Based on this analysis, the malware analysis tool 114 may generate one or more alerts 136 and/or a report that includes the results of the malware analysis. For example, an alert 136 may be transmitted to the downstream administration component 116 to inform an administrator of malicious startup commands identified on one or more of the devices 102. The report 132 is generally transmitted to the administration component 116 to inform the administrator of results of any analysis performed. The results report may, for example, include a list of one or more startup commands 104 that should be flagged for additional review or monitoring by the administrator.

Analysis results and/or other related data from the malware analysis tool 114 may also be received by the threat detection device 112, where this information may be used to further improve the identification of suspicious startup commands 108 by updating one or both of the verb list 118 and the statistical model 120. For example, if a new command tag 122 is determined to be associated with malware and this command tag 122 has never before been identified by the threat detection device 112, then the malicious verb list 118 and/or the list of known malicious command tags 126 may be updated to include appropriate entries for identifying this command tag 122 in the future and determining that the tag 122 is associated with the presence of malware. Moreover, the statistical model 120 may also be updated to include statistical information about this new command tag 122 (e.g., a proportion or percentage of the devices 102 in which the command tag 122 is identified). The threat detection device 112 may also be configured to monitor statistical information about this new command tag 122 during ongoing operation so that historical information about the relative frequency of this command tag 122 can be monitored over time.

Figure 3:
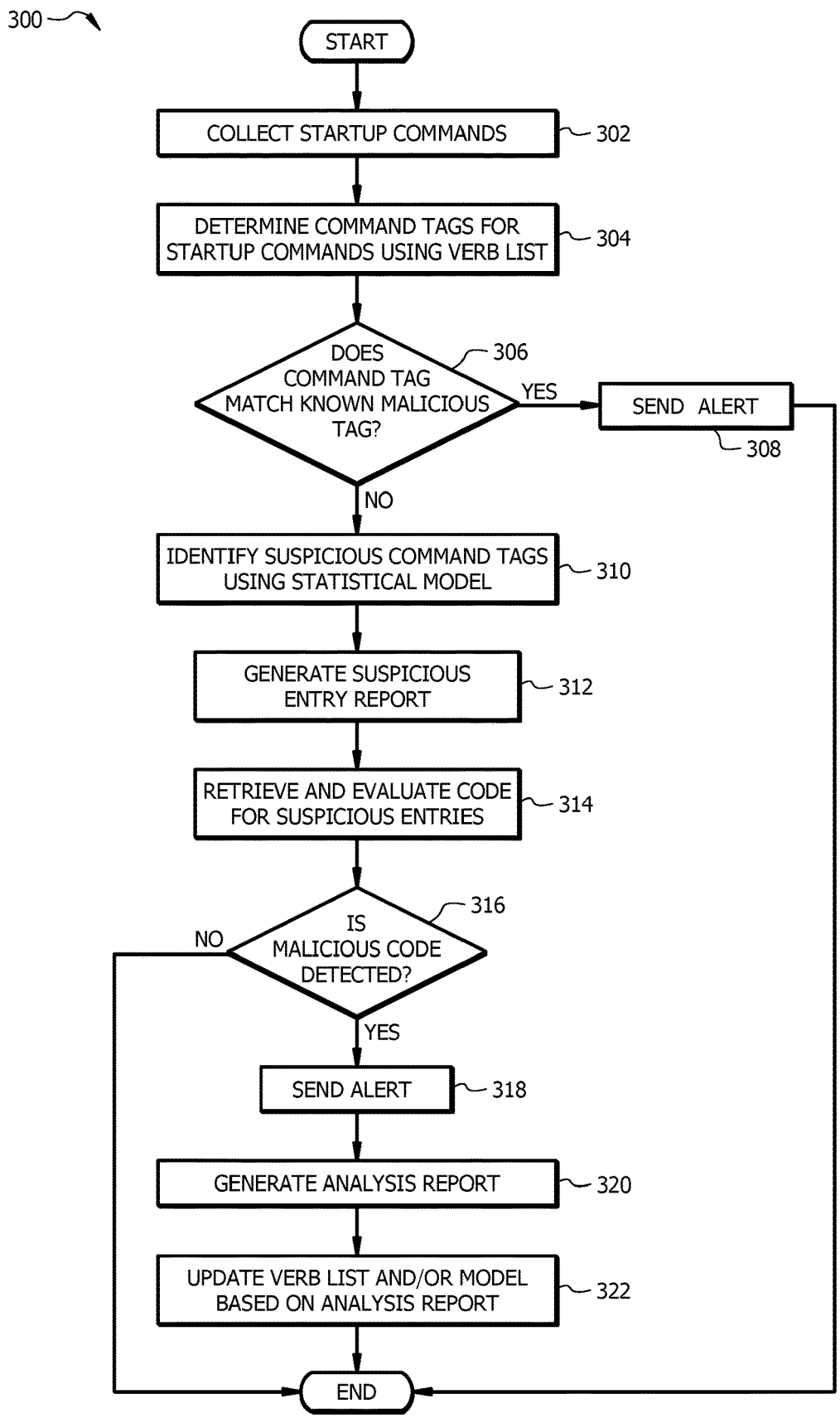
FIG. 3 is a flowchart of a method for operating the system of FIG. 1 in order to detect suspicious startup commands.

FIG. 3 is a flowchart of a method 300 for detecting one or more suspicious startup commands 108 using the system 100 of FIG. 1. The system 100 may implement method 300 to identify and report suspicious startup commands 108 associated with one or more of the devices 102. In general, method 300 facilitates the efficient and effective identification of suspicious startup commands 108 in devices 102, while also allowing for further evaluation of these suspicious startup commands 108 to determine whether these startup commands are malicious (i.e., associated with malware) or safe (i.e., not associated with malware).

At step 302, startup commands 104 are collected or received from the plurality of computing devices 102 of FIG. 1. For example, devices 102 may be configured to automatically transmit these startup commands 104 to the collection server 110 (e.g., on a predetermined schedule). For example, each of devices 102 may receive a request from the collection server 110 for startup commands 104 and, responsive to the request, the devices transmit their startup commands 104 to the collection server 110. Alternatively, the collection server 110 may be configured to automatically access memory of the devices 102 and extract copies of the startup commands 104. The collection server 110 then generally stores the startup commands 104 in any appropriate format, for example, in one or more tables for processing the startup commands 104 in subsequent steps of method 300. After the startup commands 104 are collected, the startup commands 104 may be reformatted as needed (e.g., segmented into two or more startup command portions) for further processing.

At step 304, the received startup commands 104 are transformed into command tags 122 using the verb list 118 (e.g., as described with respect to FIGS. 1 and 2 above). For example, the threat detection device 112 of FIG. 1 may receive the startup commands 104 from the collection server 110, access the verb list 118, and compare portions (e.g., command strings) of each startup command to predefined command portions (e.g., the "Command strings" of TABLE 1) and/or related strings associated with the portions (e.g., the "Related strings" of TABLE 1) to lookup the corresponding tag for the startup command portion (e.g., in the "Tag" column of TABLE 1). Startup command portions (e.g., strings) that do not have a corresponding tag are typically flagged for review by an administrator and included in report(s) generated in method 300. This process is generally repeated for all portions of each of the startup commands 104 to identify all relevant tags for the startup command 104. These tags are then appropriately combined (e.g., concatenated) to generate the command tag 122 for the startup command 104.

At step 306, the threat detection device 112 determines, for a given command tag, whether the command tag 122 corresponds to a known malicious startup command 126. For example, the tool 112 may access a record of predefined command tags 126 that are known to be malicious stored in a database (e.g., database 260 of FIG. 2) and determine whether the command tag 122 approximately or exactly matches (e.g., according to matching criteria that are the same as or similar to those described above) one of the predefined command tags 126. The threat detection device 112 may determine that a command tag 122 has a high probability of being associated with malware if the command tag 122 matches a predefined command tag 126 known to be malicious.

At step 308, if the command tag 122 matches a command tag 126 known to be associated with malware, an alert 134 is transmitted by the threat detection device 112. Generally, the alert 134 is not transmitted for suspicious startup commands 108 that are not determined to have a high probability of being associated with malware in step 306. Instead, as shown in FIG. 3, method 300 proceeds to step 310 to use the threat analysis model 120 to identify suspicious startup commands 108 that may be transmitted to the malware analysis tool 114 for further evaluation. While the alert 134 is generally transmitted to the downstream component 116 to inform an administrator of suspicious startup command(s) 108, the alert 134 may also or alternatively be transmitted to the infected device 102a to inform a user of the device 102a of the presence of a malware-related startup command 122.

At step 310, the threat detection device 112 uses the threat analysis model 120 to identify one or more command tags 122 that may be associated with malware. The threat analysis model 120 generally involves statistical frequency analysis, which is used to identify command tags 122 that may correspond to malicious startup commands (i.e., that correspond to suspicious startup commands). The suspicious startup commands 108 are flagged as candidates for further analysis by device 120 (e.g., in steps 312 and 314, described below). Statistical frequency analysis generally involves determining the frequency at which different command tags 122 occur (e.g., the proportion of the devices 102 in which the command tag is observed) and, based at least in part on the frequencies (e.g., or proportions), identify suspicious command tags 124 (e.g., as described with respect to FIGS. 1 and 2 above). In general, command tags 122 that occur more frequently (e.g., in a larger percentage of devices 102) are considered to have a lower probability of being associated with malware or other malicious processes. Meanwhile, command tags 122 that occur less frequently (e.g., in a smaller percentage of devices 102) are considered to have an increased probability of being associated with malware or other malicious processes.

For example, statistical frequency analysis may be used by the threat analysis model 120 to determine in what proportion (e.g., or percentage) of the devices 102 being monitored each command tag 122 is observed and to flag certain command tags 122 as suspicious if these command tags 122 occur in less than a threshold proportion (e.g., or percentage) of the devices 102. As an example, statistical frequency analysis may be used to determine that a first command tag is observed in 50% of devices 102 (e.g., such that the first command tag is considered "moderately common"). Meanwhile, statistical frequency analysis may be used to determine that a second command tag is observed in 0.5% of devices 102 (e.g., such that the second command tag is considered "rare"). The threat detection device 112 compares these calculated proportions to a predetermined threshold proportion below which a command tag 122 is considered suspicious. For instance, if the threshold is 5%, the first, "moderately common" command tag is not determined to be suspicious, while the second, "rare" command tag is determined to be suspicious. The threat detection device 112 then determines one or more suspicious startup commands 108 that have the suspicious second command tag.

At step 312, the threat detection device 112 may transmit a suspicious startup command report 128 to the downstream administration component 116. This report 128 generally includes the suspicious startup commands 108 identified by the threat detection device 112. For example, the threat detection device 112 may be configured to determine which suspicious startup commands 128 to include in a report 128 (e.g., based on predetermined report generation parameters) and in which order the suspicious startup commands 108 should be presented in the report 128 (e.g., based on the frequency of command tags associated with the suspicious startup commands). For example, the threat detection device 112 may generate a list that includes at least a portion of the suspicious startup commands 108 that are determined, reorganize the list based on the frequency of each startup command 108 in devices 102 (or the frequency of a command tag 122 associated with each startup command), and transmit the report 128 to the downstream administration component 116.

At step 314, the malware analysis tool 114 receives the suspicious command tags 124 and/or the suspicious startup commands 108 and retrieves corresponding suspect code 130 from the devices 102 for evaluation. The malware analysis tool 114 may use information in an internal database and/or may access information in devices 102 to determine suspect code 130 for each of the suspicious startup commands 108. For example, a database may store (e.g., in one or more tables) identifiers of code and/or code locations for a set of known startup commands. The malware analysis tool 114 may use the information in the database to determine what code 130 to access and where to access the code 130 in a given device 102. Generally, the malware analysis tool 114 sends a request for the suspect code 130 from devices 102, and, responsive to this request, the malware analysis tool 114 receives the suspect code 130. To evaluate the suspect code 130, the malware analysis tool 114 may test an instance of suspect code 130 by executing the code 130 in a controlled environment (e.g., a secure processing space of the malware analysis tool 114). If the suspect code 130 displays known behaviors of malware (e.g., attempting to access security sensitive applications or services) the suspicious startup command 108 associated with the suspect code 130 is determined to be a malicious startup command. The malware analysis tool 114 may also or alternatively employ one or more alternate or additional methods of malware detection as appreciated by those skilled in the art.

At step 316, the malware analysis tool 114 determines, based on the results of the evaluation performed in step 314, whether the suspect code 130 is malicious code (i.e., determines whether the suspicious startup commands correspond to the presence of malware in one or more of devices 102). At step 318, if malicious code is detected, an alert 136 is transmitted by the malware analysis tool 114. The alert 136 may be transmitted for example to the downstream administration component 116 to inform an administrator of the presence of malware. The alert 136 may also be transmitted to the infected device 102a.

At step 320, the malware analysis tool 114 may generate an analysis report 132. The analysis report 132 may include, for example, a list of one or more startup commands 122 that should be flagged for additional review or monitoring by the administrator. The analysis report may be transmitted to the downstream administration component 116 to inform administrator of the results of analyses performed.

At step 322, the analysis report 132 may be used by the threat detection device 112 to update the malicious verb list 118, the threat analysis model 120, and/or the list of known malicious command tags 126 associated with the threat detection device 112, as described above. For example, if a new command tag 122 is determined to be associated with malware by the malware analysis tool 114 and this command tag 122 has never before been identified by the threat detection device 112, then the malicious verb list 118 may be updated to include appropriate entries for identifying this command tag 122 and determining that the command tag 122 is associated with the presence of malware. Moreover, the threat analysis model 120 may also be updated to include statistical information about this new command tag (e.g., a frequency at which this command tag occurs in devices 102).

Figure 4:
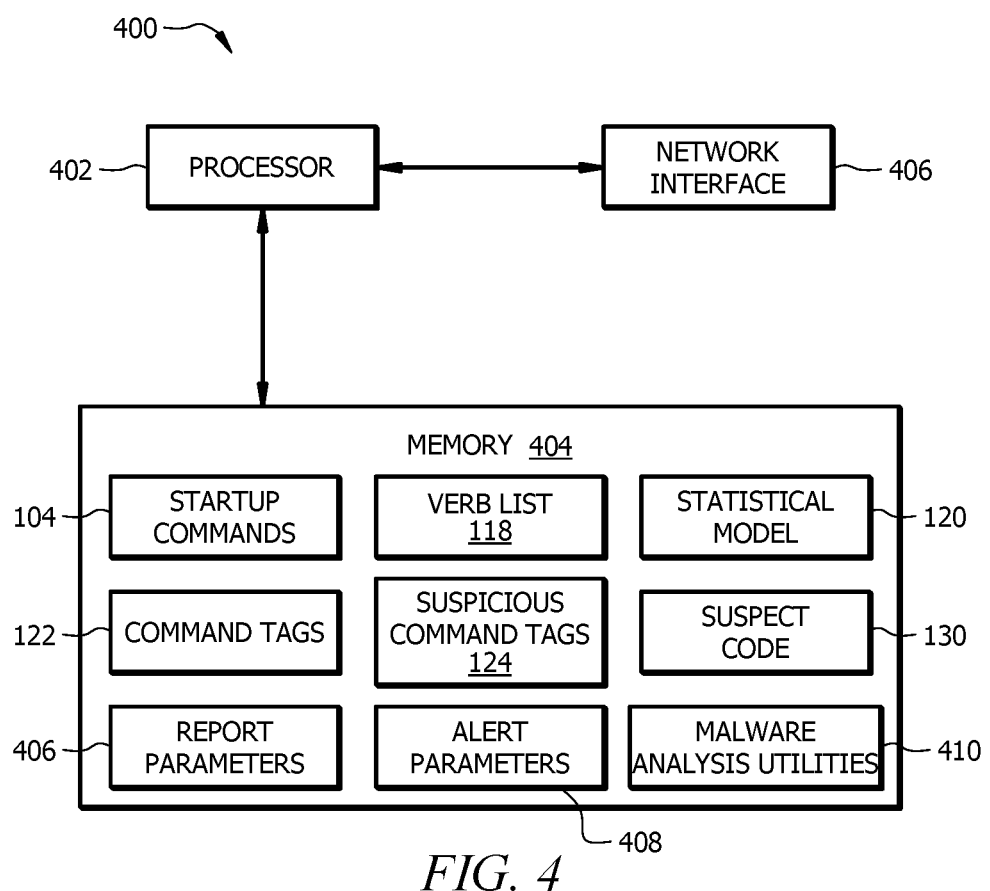
FIG. 4 is an example of a device configured to implement the system of FIG. 1 in order to detect suspicious startup commands.

FIG. 4 illustrates an embodiment of a device 400 configured to implement one or more of the components of system 100 illustrated in FIG. 1, such as collection server 110, threat detection device 112, and malware analysis tool 114. The device 400 comprises a processor 402, a memory 404, and a network interface 406. The device 400 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors implement various instructions. For example, the one or more processors are configured to execute instructions to implement the collection server 110, the threat detection device 112, and the malware analysis tool 114. In this way, processor 402 may be a special purpose computer designed to implement the functions disclosed herein, such as some or all of method 300. In an embodiment, the collection server 110, the threat detection device 112, and the malware analysis tool 114 are each implemented using logic units, FPGAs, ASICs, DSPs, or any other suitable hardware. The collection server 110, the threat detection device 112, and the malware analysis tool 114 are configured as described in FIG. 1 above.

The memory 404 stores startup commands 104, malicious verb list 118, threat analysis model 120, command tags 122, suspicious startup commands 124, suspect code 130, report parameters 406, alert parameters 408, malware analysis utilities 410, and/or any other data or instructions. The startup commands 104, malicious verb list 118, threat analysis model 120, command tags 122, suspicious startup commands 124, suspect code 130, report parameters 406, alert parameters 408, and malware analysis utilities 410 may comprise any suitable set of information, instructions, logic, rules, or code operable to execute the function described herein. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

As described above, each of the startup commands 104 is generally a command that is automatically executed when the device on which the command is stored is started up (e.g., turned on, booted up, restarted, etc.). The malicious verb list 118 includes predefined tags for commonly observed portions of startup commands (e.g., as shown in the example of TABLE 1). The malicious verb list 118 is used by device 400 to transform the startup commands 104 into command tags 122.

As described above, the threat analysis model 120 is used by device 400 to identify suspicious startup commands 124, and the suspicious startup commands 124 are used to determine suspect code 130, which may be accessed by the device to determine whether the suspect code 130 is associated with malware using the malware analysis utilities 410 (e.g., which may be used to implement functions of the malware analysis tool 114 of FIG. 1). Results generated by the malware analysis utilities 410 generally include a risk level or a probability that a given instance of suspect code 130 is associated with malware. The results may also be binary such that a given startup command 104 is determined, for example, to be either "malicious" or "not malicious."

The report parameters 406 generally provide information and rules for generating and/or formatting reports generated by device 400 (e.g., reports 128 and 132 of FIG. 1). The reports may be based on the suspicious startup commands 124, the suspect code 130, and/or any results generated by the malware analysis utilities 410. For example, the report parameters may be used to configure the device 400 to determine which suspicious startup commands to include in a report and in which order to present the startup commands (e.g., based on the frequency of command tags associated with the suspicious startup commands).

The alert parameters 408 generally provide information for configuring alerts sent by device 400. For example, the alert parameters 408 may include one or more alert thresholds, which are used to determine whether an alert 134 and/or 136 should be transmitted for a given suspicious startup command. For example, if a first suspicious startup command has a command tag that exactly matches a predefined command tag known to be associated with malware, the first suspicious startup command may be given a risk ranking of 100%. If a second suspicious startup command has a command tag that shares 80% of the tags in a predefined command tag known to be associated with malware, the second suspicious startup command may be given a risk ranking of 80%. For an example alert threshold is 95%, an alert 134 and/or 136 would be transmitted by the device 400 for the first suspicious startup command (i.e., because the risk ranking exceeds the alert threshold), but an alert 134 and/or 136 would not be transmitted for the second suspicious startup command (i.e., because the risk ranking is less than the alert threshold). The alert threshold can generally be set to any appropriate value according to the needs of the administrators. In typical embodiments, however, the alert threshold is high (e.g., exceeding 90%) to ensure that an excessive number of unnecessary alerts 134 and/or 136 are not generated by the device 400.

The network interface 406 is configured to enable wired and/or wireless communications. The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 302 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for detecting suspicious startup commands associated with a plurality of network-attached computing devices, the system comprising:
a collection server configured to:
collect startup commands associated with the plurality of network-attached computing devices, wherein each startup command is a command that is automatically executed by a device on which the startup command is stored upon startup of the device, and wherein each startup command is associated with a device identifier for the device on which the command is stored; and
a threat detection device configured to:
receive the collected startup commands from the collection server;
determine, for each startup command, a corresponding command tag for the startup command using a verb list, the verb list comprising a predefined tag for each of a set of predefined command strings, wherein each command string corresponds to a portion of a predefined command, and wherein the startup command comprises one or more command strings;
determine, using the device identifier associated with each startup command and the command tag determined for each startup command, a proportion of the plurality of devices that are associated with each command tag;
determine, based on the determined proportion of the plurality of devices that are associated with each command tag, a suspicious command tag, wherein the suspicious command tag is associated with less than a threshold proportion of the plurality of devices; and
store a report comprising the suspicious command tag, one or more suspicious startup commands associated with the suspicious command tag, and the device identifier associated with each suspicious startup command.

2. The system of claim 1, wherein the threat detection device is further configured to transmit the report and an associated alert to a downstream device.

3. The system of claim 1, wherein the threat detection device is further configured to:
determine a second suspicious command tag, wherein the second suspicious command tag matches a predefined command tag stored in a list of predefined malicious command tags; and
responsive to determination of the second suspicious command tag, transmit an alert to a downstream device, the alert comprising the second suspicious command tag, one or more second suspicious startup commands associated with the second suspicious command tag, and the device identifier associated with each second suspicious startup command.

4. The system of claim 1, further comprising a malware analysis tool configured to:
receive a first suspicious startup command from the threat analysis device;

determine whether the first suspicious startup command is associated with malware by executing the startup command in a controlled operating environment; and responsive to a determination that the first suspicious startup command comprises malware, transmit an alert to a downstream device, wherein the alert comprises the first suspicious startup command and the associated device identifier.

5. The system of claim 4, wherein:

the malware analysis tool is further configured to generate an analysis report comprising the first suspicious startup command; and the threat detection device is further configured to:
receive the analysis report; and
update entries in the verb list based on the analysis report.

6. The system of claim 4, wherein the malware analysis tool is further configured to:

generate an analysis report comprising the first suspicious startup command; and transmit the analysis report to a downstream device.

7. The system of claim 1, wherein the threat analysis device is operable to determine the proportion of the plurality of devices that are associated with each command tag using statistical frequency analysis.

8. A method for detecting suspicious startup commands associated with a plurality of network-attached computing devices, the method comprising:

collecting startup commands associated with the plurality of network-attached computing devices, wherein each startup command is a command that is automatically executed by a device on which the startup command is stored upon startup of the device, and wherein each startup command is associated with a device identifier for the device on which the command is stored;

determining, for each startup command, a corresponding command tag for the startup command using a verb list, the verb list comprising a predefined tag for each of a set of predefined command strings, wherein each command string corresponds to a portion of a predefined command, and wherein the startup command comprises one or more command strings;

determining, using the device identifier associated with each startup command and the command tag determined for each startup command, a proportion of the plurality of devices that are associated with each command tag;

determining, based on the determined proportion of the plurality of devices that are associated with each command tag, a suspicious command tag, wherein the suspicious command tag is associated with less than a threshold proportion of the plurality of devices; and storing a report comprising the suspicious command tag, one or more suspicious startup commands associated with the suspicious command tag, and the device identifier associated with each suspicious startup command.

9. The method of claim 8, further comprising transmitting the report and an associated alert to a downstream device.

10. The method of claim 8, further comprising:

determining a second suspicious command tag, wherein the second suspicious command tag matches a predefined command tag stored in a list of predefined malicious command tags; and responsive to determining the second suspicious command tag, transmitting an alert to a downstream device, the alert comprising the second suspicious command tag, one or more second suspicious startup commands associated with the second suspicious command tag, and the device identifier associated with each second suspicious startup command.

11. The method of claim 8, further comprising:

determining whether a first suspicious startup command is associated with malware by executing the startup command in a controlled operating environment; and responsive to determining that the first suspicious startup command comprises malware, transmitting an alert to a downstream device, wherein the alert comprises the first suspicious startup command and the associated device identifier.

12. The method of claim 11, further comprising:

generating an analysis report comprising the first suspicious startup command; and updating entries in the verb list based on the analysis report.

13. The method of claim 11, further comprising:

generating an analysis report comprising the first suspicious startup command; and transmitting the analysis report to a downstream device.

14. The method of claim 8, further comprising determining the proportion of the plurality of devices that are associated with each command tag using statistical frequency analysis.

15. A system for detecting suspicious startup commands associated with a plurality of network-attached computing devices, the system comprising:

a memory;

a network interface; and a hardware processor communicatively coupled to the memory, the hardware processor configured to:

collect startup commands associated with the plurality of network-attached computing devices, wherein each startup command is a command that is automatically executed by a device on which the startup command is stored upon startup of the device, and wherein each startup command is associated with a device identifier for the device on which the command is stored;

determine, for each startup command, a corresponding command tag for the startup command using a verb list, the verb list comprising a predefined tag for each of a set of predefined command strings, wherein each command string corresponds to a portion of a predefined command, and wherein the startup command comprises one or more command strings;

determine, using the device identifier associated with each startup command and the command tag determined for each startup command, a proportion of the plurality of devices that are associated with each command tag;

determine, based on the determined proportion of the plurality of devices that are associated with each command tag, a suspicious command tag, wherein the suspicious command tag is associated with less than a threshold proportion of the plurality of devices; and store a report comprising the suspicious command tag, one or more suspicious startup commands associated with the suspicious command tag, and the device identifier associated with each suspicious startup command.

16. The system of claim 15, wherein the hardware processor is further configured to transmit the report and an associated alert to a downstream device.

17. The system of claim 15, wherein the hardware processor is further configured to:
   determine a second suspicious command tag, wherein the second suspicious command tag matches a predefined command tag stored in a list of predefined malicious command tags; and
   responsive to determination of the second suspicious command tag, transmit an alert to a downstream device, the alert comprising the second suspicious command tag, one or more second suspicious startup commands associated with the second suspicious command tag, and the device identifier associated with each second suspicious startup command.

18. The system of claim 15, wherein the hardware processor is further configured to:
   determine whether a first suspicious startup command is associated with malware by executing the startup command in a controlled operating environment; and
   responsive to a determination that the first suspicious startup command comprises malware, transmit an alert to a downstream device, wherein the alert comprises the first suspicious startup command and the associated device identifier.

19. The system of claim 18, wherein the hardware processor is further configured to:
   generate an analysis report comprising the first suspicious startup command; and
   update entries in the verb list based on the analysis report.

20. The system of claim 18, wherein the hardware processor is further configured to:
   generate an analysis report comprising the first suspicious startup command; and
   transmit the analysis report to a downstream device.

* * * * *